United States Patent Office 3,490,698
Patented Jan. 20, 1970

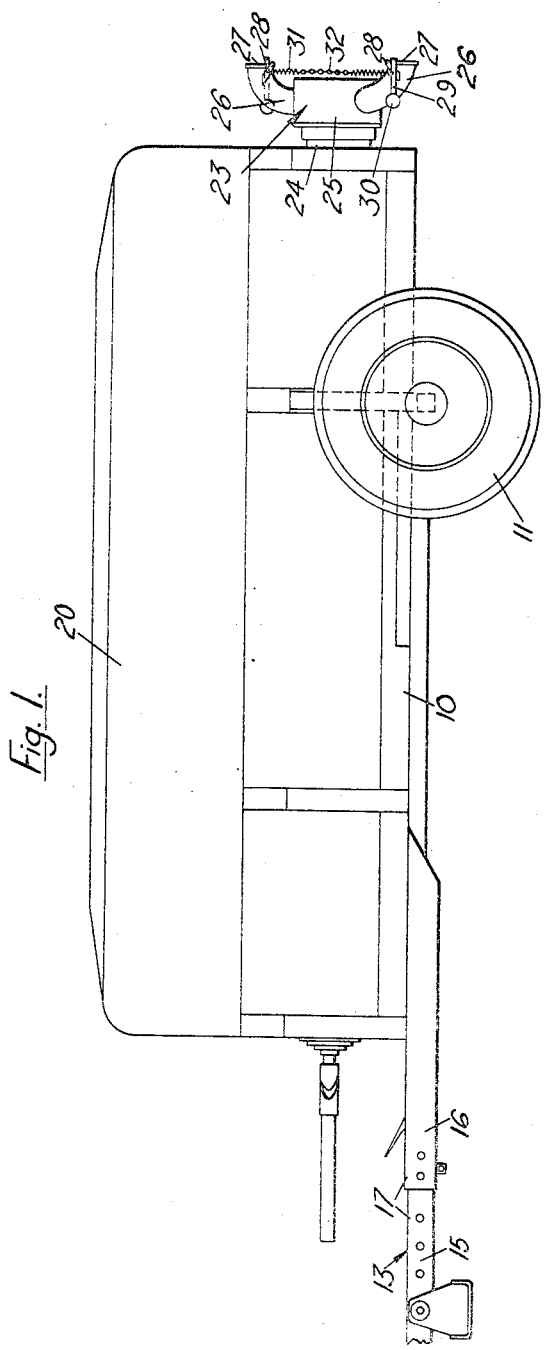

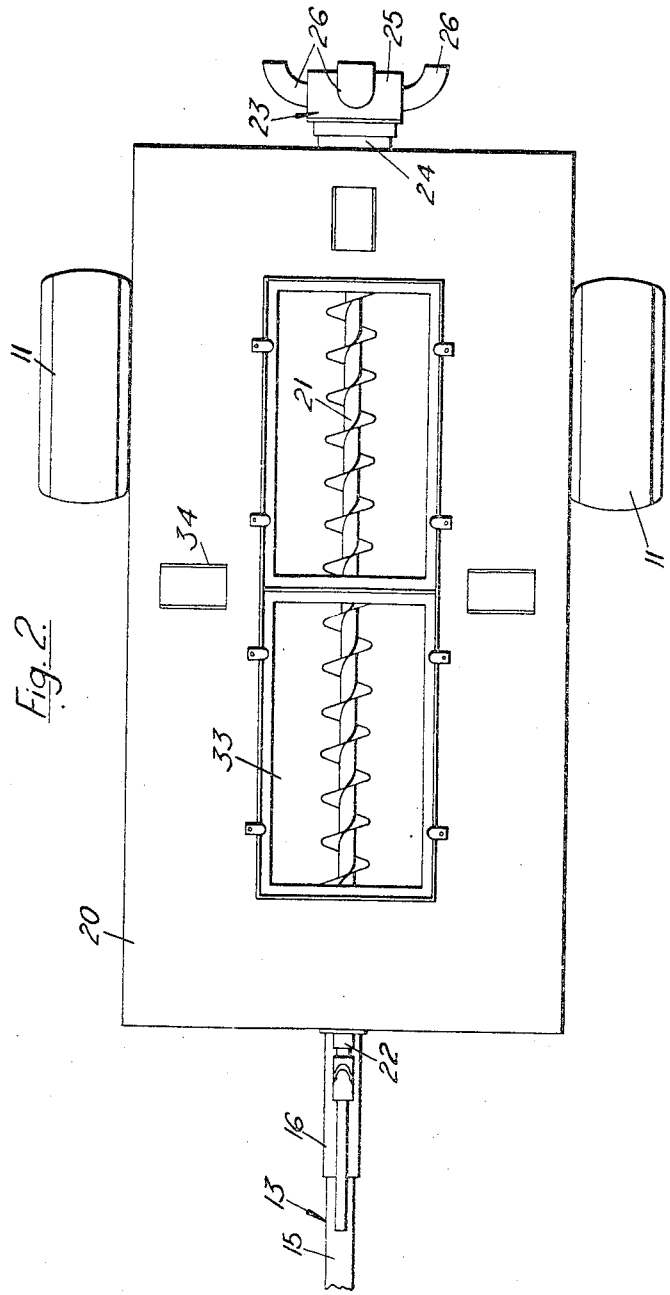

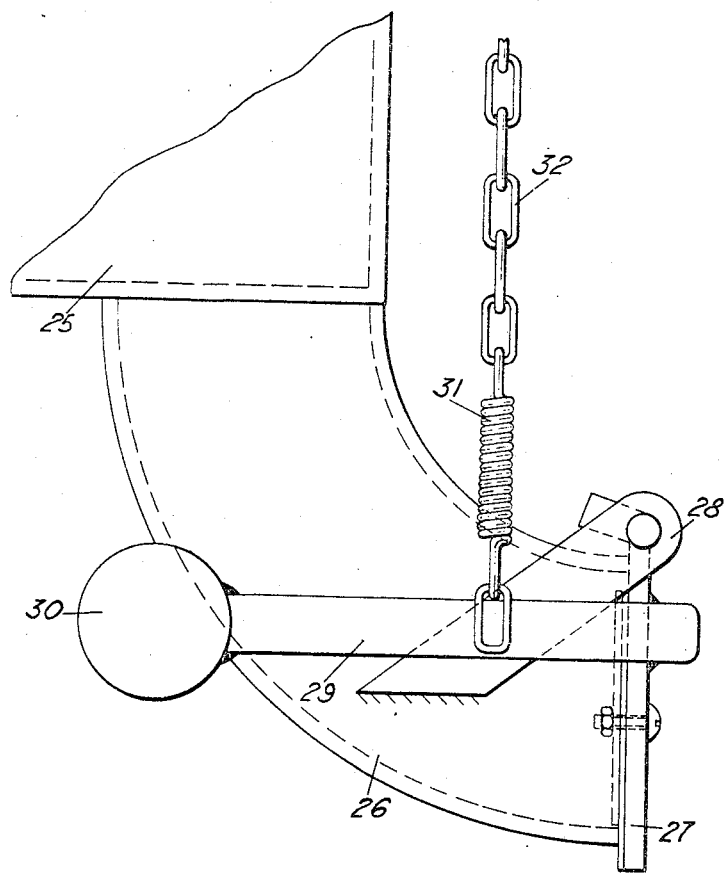

3,490,698
SPREADERS FOR FLUENT MATERIALS
William R. Irving and William G. Dixon, Carlisle, England, assignors to Porter Engineering Company Limited and Stanley-Ivison and William Gordon Dixon
Filed Jan. 11, 1968, Ser. No. 697,217
Claims priority, application Great Britain, Jan. 27, 1967, 4,069/67
Int. Cl. A01c *15/00*
U.S. Cl. 239—172
6 Claims

ABSTRACT OF THE DISCLOSURE

A spreader for fluent materials, including a container, conveying means within the container and distributing means rotatably mounted externally of the container in communication with the conveying means and including an outlet duct having a closure openable under the influence of centrifugal force at its outlet end.

---

The present invention concerns improvements in or relating to spreaders for fluent materials.

According to the present invention there is provided a spreader for fluent materials including a container, conveying means within the container, distributing means rotatably mounted externally of the container and in communication with said conveying means, said distributing means including at least one outlet duct spaced from the axis of rotation of the distributing means such that material moved from the container to the distributing means by the conveying means is spread by said distributing means due to the action of centrifugal force.

One embodiment of the present invention will now be described, by way of example, with reference to the accompanying drawings, in which:

FIG. 1 shows an elevation of a spreader;

FIG. 2 shows a plan of the spreader of FIG. 1 with certain parts omitted for clarity, and FIG. 3 shows a detail from FIG. 1.

FIG. 1 shows a spreader used for spreading farmyard slurry and includes a chassis 10 on which two wheels 11 are mounted, the chassis being provided with a towbar 13 of square cross-section adapted for attachment to, for example, a tractor. The towbar comprises two telescopically mounted sections 15, 16 each being provided with co-operating holes 17 such that a pin can be inserted through the holes to hold the towbar in one adjusted position.

A container 20, generally in the shape of a hopper, is mounted on the chassis 10 and is provided near its bottom with a screw conveyor 21 which runs the length of the container.

The shaft 22 of the screw conveyor 21 extends through the casing at the end adjacent the towbar and is connectible to the power take-off of a tractor towing the spreader.

The end of the container 20 remote from the towbar is provided with distributing means 23 for spreading the slurry. This distributing means includes a pipe 24 of approximately 7½" diameter extending into the container and protruding slightly out of the container. A drum 25 is rotatably mounted on the pipe externally of the container and is fixed to an extension of the shaft 22 of the screw conveyor 21 such that the drum rotates with the screw conveyor. The drum is provided with three holes to which one end of three outlet ducts 26 are attached. The outlet ducts are bent at their outlet ends such that said ends lie substantially parallel to the axis of the shaft 22. The screw conveyor extends into that part of the tube 24 within the container.

Each outlet duct 26 is provided with a closure which takes the form of a hinged door 27 (FIG. 1), the hinges 28 being mounted on that part of the duct nearest to the axis of the drum 25. A lever 29 is attached to the door 27, extends towards the container and includes a counterweight 30 at its free end. A spring 31 has one end attached to the lever 29 and the other end removably attached to a link of a chain 32, such that by transferring said other end from link to link of the chain the spring force is adjustable. One chain 32 is provided for each duct closure, the chains being joined together at their ends remote from the spring.

The top of the container 20 is provided with a loading door 33 and channels 34 are attached to the container to hold the feed pipe when the container is being loaded.

In operation the container 20, loaded with slurry, is towed across a field by a tractor, the shaft 22 of the screw conveyor 21 being coupled to the power take-off of the tractor. When the tractor driver wishes to spread the slurry he engages the power take-off, thus rotating the screw conveyor and with it the distributing means 23. Slurry is fed by the conveyor 21 through the pipe 24 to the drum 25 of the distributing means and pressure of the slurry builds up. Within the drum the slurry is thrown outwards by centrifugal force into the outlet ducts 26. By selection of specific counterweights 30 on the levers 29, and a specific spring force, the door 27 closing the outlet ducts will not open until a predetermined speed of rotation and slurry pressure within the drum is attained. At this speed centrifugal force and slurry pressure will throw the doors open and slurry will escape from the outlet tube to be thrown under pressure in a substantially conical spray over a relatively wide area.

To end spreading, the tractor driver simply disconnects power take-of and the doors on the outlet ducts automatically close due to the spring force and decreased slurry pressure, this stopping discharge of slurry.

Thus the tractor driver need not stop his vehicle before commencing the spreading operation but need only engage the power take-off.

We claim:

1. Spreader for fluent materials including a container, conveying means within the container and distributing means rotatably mounted externally of the container in communication with said conveying means, said distributing means including a rotatable drum and a plurality of ducts leading from the drum, the axis of the ducts at outlet being substantially parallel to the axis of rotation of the drum, a closure being provided at the outlet end of the, or each, duct said closure comprising a door hinged to the duct, the hinge being mounted on that part of the outlet end of the duct nearest the axis of rotation, a counterweight attached to a lever extending from the door and a spring tending to close the door until a predetermined speed of rotation of the distributing means is attained, whereupon the spring force is then overcome by centrifugal force on the counterweight and the door is opened to allow discharge of material.

2. Spreader according to claim 1, wherein one end of the spring is attached to the lever and the other end is removably fixed in a link of a chain.

3. A spreader as claimed in claim 1, wherein the distributing means includes a pipe extending into the container, a drum rotatably mounted about the pipe externally of the container, and holes are provided in the drum in communication with the, or each, outlet duct.

4. A spreader as claimed in claim 3, wherein three outlet ducts are provided, each fixed by one end to the drum and being curved so that each other end lies substantially parallel to the axis of the drum.

5. A spreader as claimed in claim 3, wherein the conveying means is a screw conveyor, the outlet end of which lies within the pipe of the distributing means.

6. A spreader as claimed in claim 5, wherein the drum of the distributing means is mounted on an extension of the screw conveyor.

References Cited

UNITED STATES PATENTS

| 185,083 | 12/1876 | Diltz | 239—687 |
| 364,424 | 5/1887 | Love | 239—675 |
| 1,539,737 | 5/1925 | Hester | 239—670 |
| 2,521,888 | 9/1950 | Wilson | 239—681 |
| 3,170,264 | 2/1965 | Waldrum | 239—681 |

FOREIGN PATENTS 584,572  2/1925  France.

ROBERT B. REEVES, Primary Examiner

H. S. LANE, Assistant Examiner

U.S. Cl. X.R.

239—569, 675, 687, 689